United States Patent Office 3,439,035
Patented Apr. 15, 1969

3,439,035
AMINOALKANOLBENZENESULFONAMIDES
Johann Martin Grisar and William J. Hudak, Cincinnati, Ohio, assignors to Richardson-Merrell Inc., New York, N.Y., a corporation of Delaware
No Drawing. Filed June 21, 1966, Ser. No. 559,076
Int. Cl. C07c *143/78;* C07d *51/00, 29/34*
U.S. Cl. 260—556                    11 Claims

ABSTRACT OF THE DISCLOSURE

Discloses novel compounds which can be used as vasodepressors or to lower blood cholesterol or as intermediates for preparing analogous ethylenically unsaturated compounds. The disclosed compounds are of the formula

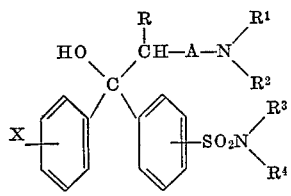

wherein:
(a) each of R, $R^1$, $R^2$, $R^3$, and $R^4$ is a member selected from the group consisting of hydrogen, (lower) alkyl, and $R^1$ and $R^2$ or $R^3$ and $R^4$, respectively, when taken together with the nitrogen to which they are joined are pyrrolidino, piperidino, piperazino or morpholino;
(b) A is saturated alkylene having 1 to 5 carbon atoms; and
(c) X is a member selected from the group consisting of hydrogen, (lower) alkyl, (lower) alkoxy, halogen, trifluoromethyl and the group

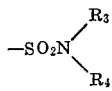

wherein $R^3$ and $R^4$ have the same meaning given hereinabove; and pharmaceutically acceptable acid addition salts thereof.

---

This invention relates to novel aminoalkanolbenzenesulfonamides. More particularly, it relates to substituted (ω-amino - 1 - hydroxy - 1 - phenylalkyl)benzenesulfonamides, their acid addition salts and process for their manufacture. The novel aminoalkanolbenzenesulfonamides of this invention can be represented by the formula:

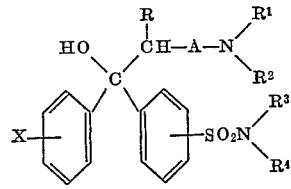

Formula A wherein: each of R, $R^1$, $R^2$, $R^3$, and $R^4$ is hydrogen or (lower) alkyl or $R^1$ and $R^2$ or $R^3$ and $R^4$, respectively, when taken together with the nitrogen atom to which they are joined, form a heterocyclic group such as pyrrolidino, piperidino, piperazino or morpholino; A is a saturated, straight or branched chain alkylene group containing 1 to 5 carbon atoms; and X is hydrogen, (lower) alkyl, (lower) alkoxy, halogen, trifluoromethyl, or a sulfamoyl group (i.e.,

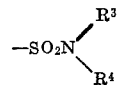

wherein $R^3$ and $R^4$ have the same meaning as given above).

The term (lower) as used herein to describe alkyl or alkoxy relates to such a group having from 1 to 4 carbon atoms. Preferably, each of $R^1$, $R^2$, $R^3$ and $R^4$ in the above Formula A is methyl or ethyl, whereas R is preferably hydrogen. Illustrative of the saturated alkylene group as represented by A in the generic formula for the novel compounds of this invention (Formula A) there can be mentioned: methylene; 1,2-ethylene; 1-methyl-1,2-ethylene; 2-methyl-1,2-ethylene; 1,3-propylene; 1,4-butylene; 1,3-butylene; and the like. Preferably A is saturated alkylene having 1 to 3 carbon atoms. Illustrative of halogen substituents for X in the above Formula A there can be mentioned: chlorine, bromine and fluorine. The sulfamoyl group shown in the above Formula A and various substituents represented by X can be in various positions on the phenyl groups, e.g., meta- or para-. Preferably, however, X is hydrogen and the sulfamoyl group is in the para-position.

Salts of the novel compounds of this invention are particularly pharmacologically acceptable, non-toxic acid addition salts, such as those with inorganic acids, e.g., hydrochloric, hydrobromic, sulfuric, phosphoric acids and the like, with organic carboxylic acids, e.g., acetic, propionic, glycolic, lactic, pyruvic, oxalic, malonic, succinic, fumaric, malic, tartaric, citric, ascorbic, maleic, hydroxymaleic, dihydroxymaleic, fumaric, benzoic, phenylacetic, 4-aminobenzoic, 4-hydroxybenzoic, anthranilic, cinnamic, mandelic, salicyclic, 4-aminosalicyclic, 2-phenoxy-benzoic, 2-acetoxybenzoic acid and the like, or organic sulfonic acids, e.g., methane sulfonic, ethane sulfonic, 2-hydroxyethane sulfonic, p-toluene sulfonic acid and the like. Neutral or acid salts may be formed.

Novel compounds of this invention (including acid addition salts thereof) have vasodepressor activity in animals and can be used as anti-hypertensive agents to relieve hypertensive conditions, e.g., neurogenic or renal hypertension. The novel compounds (including acid addition salts thereof) lower blood cholesterol levels in animals. Additionally, compounds of this invention are useful as intermediates for the preparation of aminoalkenylbenzenesulfonamides which possess hypotensive activity. The aminoalkenylbenzenesulfonamides and their method of preparation are described in our copending application Ser. No. 559,075, filed concurrently herewith, and can be represented by the formula:

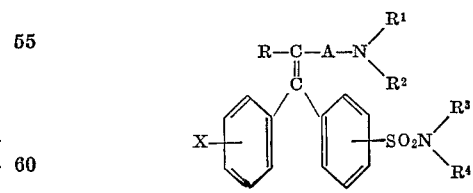

wherein: each of R, $R^1$, $R^2$, $R^3$, $R^4$ is hydrogen or (lower) alkyl; and each of A and X have the same meaning as given in the above generic Formula A. Briefly, the aminoalkenylbenzenesulfonamides are prepared by dehydrating corresponding aminoalkanolbenzenesulfonamides of this invention, for example, by contact with PCl₅, acetic anhydride, and the like.

The novel compounds of this invention may be used as medicaments in the form of pharmaceutical preparations which contain the novel compounds in admixture with a pharmaceutical organic or inorganic solid or liquid carrier suitable for enteral, e.g., oral, or parenteral administration. The pharmaceutical preparations can be in solid form, e.g., tablets or capsules, or in liquid form, for example, in solutions, suspensions or emulsions. The quantity of novel compound medicament in the unit-dosage can vary over a wide range, for example, from about 50 to 500 milligrams, depending on the mode of administration and the animal being treated. If desired, such pharmaceutical preparations may contain auxiliary substances, such as preserving agents, stabilizing agents, wetting agents or emulsifying agents, salts for varying the osmotic pressure or buffers and the like. They may also contain, in combination, other therapeutically useful substances, such as tranquilizers or other CNS depressants, diuretics, other blood pressure lowering agents, etc.

The novel compounds of the present invention may be prepared by a number of procedures. Two procedures are outlined in the following scheme:

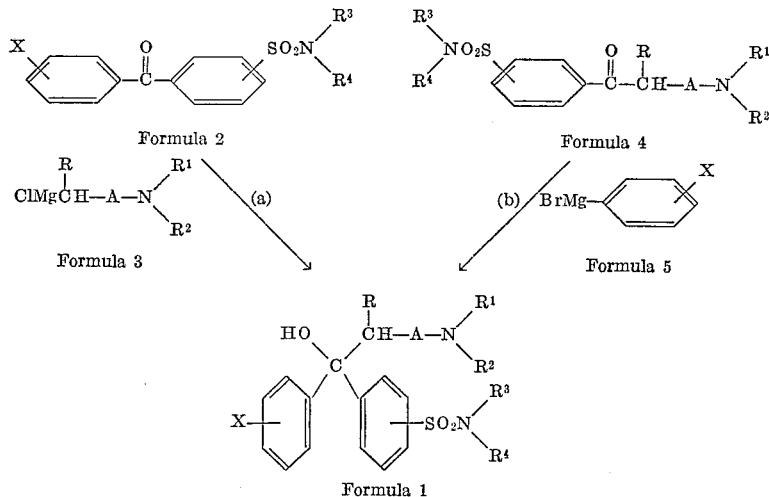

wherein R, R¹, R², R³, R⁴, A and X are as defined in generic Formula A hereinbefore.

Procedure (a) outlined in the above scheme represents the Grignard reaction of an appropriately substituted benzoylbenzenesulfonamide (Formula 2) with an appropriately substituted aminoalkylmagnesium halide (Formula 3). A variety of solvents may be employed in this reaction; a particularly suitable solvent was found to be tetrahydrofuran. It was found to be advantageous to employ an excess (100–300%) of aminoalkylmagnesium halide. Several procedures to prepare the required benzoylbenzenesulfonamides (Formula 2) are known to the art. For instance, diazotization of aminobenzophenones in glacial acetic acid at 10° C. using sodium nitrite and hydrochloric acid and addition to the resulting diazonium salt of a saturated solution of sulfur dioxide in glacial acetic acid containing catalytic amounts of cupric chloride results in precipitation of benzoylbenzenesulfonyl chlorides that can easily be converted to the corresponding sulfonamides by treatment with ammonia, primary or secondary amines. This procedure was first described by H. Meerwein and co-workers in Chemische Berichte, volume 90, pp. 841–852 (1952).

Alternatively, the benzoylbenzenesulfonamides (Formula 2) may be obtained by oxidation of the corresponding benzylbenzenesulfonamides as described by F. G. Bordwell and G. W. Crosby, Journal of the American Chemical Society, volume 78, pp. 5367–5371 (1956) and other workers. A third alternative of preparing benzoylbenzenesulfonamides (Formula 2) consists of the Grignard reaction of cyanobenzenesulfonamides with substituted phenylmagnesium halides. The preparation of aminoalkylmagnesium halides (Formula 3) is well known to the art and was first described by A. Marxer in Helvetica Chimica Acta, volume 24, p. 209E (1941).

Procedure (b) outlined in the above scheme represents the Grignard reaction of aminoalkanoylbenzenesulfonamides (Formula 4) with appropriately substituted phenylmagnesium halides (Formula 5). A variety of solvents may be employed in this reaction; a particularly suitable solvent was found to be diethylether. It was found to be advantageous to use the hydrochloride salt of the aminoalkanoylbenzenesulfonamide rather than its free base. Use of a 3 to 5-fold excess of Grignard reagent (Formula 5) was found to increase the yield in this reaction. The advantage of this procedure over the alternative procedure (a) outlined in the above scheme lies in the fact that lower homologs can be prepared that are not obtainable by procedure (a). For instance, compounds of Formula 1 where A represents a methylene or an alkyl-substituted methylene radical can only be prepared by procedure (b).

Preparation of the aminoalkanoylbenzenesulfonamides (Formula 4) has not been described in the art. They can be obtained by the Mannich reaction using alkanoylbenzenesulfonamides (Formula 6), an aliphatic aldehyde and an amine as outlined in the following scheme:

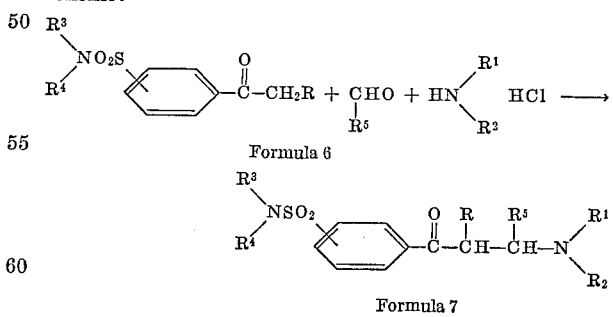

where R, R¹, R², R³ and R⁴ are as defined above and R⁵ represents a hydrogen atom or a (lower) alkyl group. A variety of experimental conditions can be employed to effect this reaction. A convenient procedure consists of refluxing equimolar amounts of the reactants in ethanol for six hours in the presence of a trace of hydrochloric acid. Several procedures to prepare the alkanoylbenzenesulfonamides (Formula 6) are known to the art. In particular, the three procedures described above for preparation of benzoylbenzenesulfonamides (Formula 2) can be used.

The following examples are illustrative of the invention.

EXAMPLE 1

Preparation of N,N - dimethyl - p - (4-dimethylamino-1-hydroxy-1-phenylbutyl)benzenesulfonamide acid maleate A solution of 39.4 g. of p-aminobenzophenone in 400 ml. of glacial acetic acid containing 44 ml. of concentrated hydrochloric acid and 80 g. of ice was diazotized at 5–10° by dropwise addition of a solution of 13.8 g. of sodium nitrite in 20 ml. of water over 30 minutes. The cold solution was added slowly to a cold solution of approximately 100 g. of sulfur dioxide gas in 400 ml. of glacial acetic acid containing 4 g. of cupric chloride in 20 ml. of water. After a period of 1 to 3 hours, evolution of nitrogen gas ceased and, on addition of 400 ml. of water, a precipitate resulted that was collected on a filter and washed with water. The resulting p-benzoylbenzenesulfonyl chloride was dissolved in 150 ml. of acetone, 150 ml. of 25% aqueous dimethylamine was added and the mixture was acidified with 2 N hydrochloric acid. The resulting precipitate was collected on a filter, washed with water and recrystallized from isopropanol to give 41.25 g. (71% yield) of N,N-dimethyl-p-benzoyl benzenesulfonamide, M.P. 124–125° C.

*Analysis.*—Calculated for $C_{15}H_{15}NO_3S$ is C, 62.26; H, 5.22; N, 4.84. Found: C, 62.33; H, 5.14; N, 4.59.

A solution of 30.0 g. of the above compound in 250 ml. of dry tetrahydrofuran was added to 3-dimethylaminopropylmagnesium chloride (prepared from 7.6 g. of magnesium powder and 37.9 g. of 3-dimethylaminopropyl chloride in 300 ml. of dry tetrahydrofuran) and the mixture was stirred at room temperature overnight under an atmosphere af nitrogen. The reaction mixture was decomposed by addition of 200 ml. of 3 N ammonium chloride solution, the tetrahydrofuran phase was separated and evaporated to dryness and the product was extracted into ether and washed. The product was purified by extraction into 2 N hydrochloric acid, washing with ether, reconversion to the free base by addition of sodium carbonate solution and extraction into ether. The crude product obtained after evaporation of solvent was recrystallized from ethanol to give 27.9 g. (71% yield) of N,N - dimethyl-p-(4-dimethylamino-1-hydroxyl-1-phenylbutyl)benzenesulfonamide, M.P. 98–99°. Addition of one molar equivalent of maleic acid and recrystallization from isopropanol gave the acid maleate salt, M.P. 125–128° C.

*Analysis.*—Calculated for $C_{20}H_{28}N_2O_3S \cdot C_4H_4O_4$ is C, 58.51; H, 6.54; S, 6.51. Found: C, 58.77; H, 6.48; S, 6.52.

EXAMPLE 2

Preparation of N,N - dimethyl - p-(4-dimethylamino-1-hydroxy - 3 - methyl - 1-phenylbutyl)benzenesulfonamide acid maleate The procedure described in Example 1 was followed substituting 3-dimethylamino-2-methylpropyl chloride for 3-dimethylaminopropyl chloride. The product obtained in 84% yield was converted to the acid maleate salt, M.P. 149–151° C.

*Analysis.*—Calculated for $C_{21}H_{30}N_2O_3S \cdot C_4H_4O_4$ is C, 57.27; H, 6.76; S, 6.33. Found: C, 59.20; H, 6.79; S, 6.27.

EXAMPLE 3

Preparation of 4 - [4 - (p-dimethylsulfamoylphenyl)-4-hydroxy-4-phenylbutyl] morpholine acid maleate The procedure described in Example 1 was followed substituting 3-morpholinopropyl chloride (prepared from 1-bromo-3-chloropropane and excess morpholine in refluxing benzene) for 3-dimethylaminopropyl chloride. The product obtained in 70% yield was converted to the acid maleate salt, M.P. 149–153° C.

*Analysis.*—Calculated for $C_{22}H_{30}N_2O_4S \cdot C_4H_4O_4$ is C, 58.41; H, 6.41; N, 5.24. Found: C, 58.33; H, 5.44; N, 5.00.

EXAMPLE 4

Preparation of 1 - methyl - 4 - [4 - (p-dimethylsulfamoylphenyl) - 4 - hydroxy-4-phenylbutyl]piperazine diacid maleate The procedure described in Example 1 was followed substituting 1-methyl-4-(3-chloropropyl)piperazine (prepared from 1-bromo-3-chloropropane and excess 1-methylpiperazine in refluxing ether) for 3-dimethylaminopropyl chloride. The product obtained in 55% yield was converted to the diacid maletate salt, M.P. 176–178° C. (dec.).

*Analysis.*—Calculated for $C_{23}H_{33}N_3O_3S \cdot 2C_4H_4O_4$ is C, 56.09; H, 6.23; N, 6.33. Found: C, 56.14; H, 6.27; N, 6.09.

EXAMPLE 5

The procedure described in Example 1 was followed using the appropriate starting materials. The following compounds were obtained:

| $-N\begin{smallmatrix}R_3\\R_4\end{smallmatrix}$ | M.P. of free base, °C. |
|---|---|
| $-NH_2$ | 179–181 |
| $-NHCH_3$ | 124–126 |
| $-N(C_2H_5)_2$ | 105–107 |
| $-N\underset{\phantom{O}}{\bigcirc}O$ | 114–116 |

EXAMPLE 6

Preparation of N,N-dimethyl - p - [4-dimethylamino-1-hydroxy-1-(m - trifluoromethylphenyl)butyl]-benzenesulfonamide hydrochloride A solution of 26.25 g. of N,N-dimethyl-p-cyanobenzenesulfonamide in 200 ml. of dry tetrahydrofuran was added to m - trifluoromethylphenylmagnesium bromide (prepared from 6.7 g. of magnesium turnings and 61.8 g. of m-trifluoromethylphenyl bromide in 200 ml. of dry tetrahydrofuran) and the mixture was refluxed for 24 hours. The mixture was allowed to cool and 250 ml. of 2 N hydrochloric acid was added dropwise. Solvent and excess reactants were removed by steam distillation that was prolonged sufficiently (30 minutes at 100° C.) to assure complete hydrolysis of the ketimine salt, that is formed initially in this reaction, to the corresponding ketone. The product was extracted into chloroform and the extract was washed with water and sodium bicarbonate solution and dried over sodium sulfate. The oil obtained after evaporation of solvent crystallized from acetonitrile (61% yield) and was recrystallized from isopropanol, M.P. 130–131° C.

*Analysis.*—Calculated for $C_{16}H_{14}F_3NO_3S$ is C, 53.77; H, 3.95; S, 8.97. Found: C, 53.92; H, 4.07; S, 9.03.

The above N,N-dimethyl-p-(m-trifluoromethylbenzoyl) benzenesulfonamide (24.1 g.) in 200 ml. of dry tetrahydrofuran was added to 3-dimethylaminopropylmagnesium chloride (prepared from 6.5 g. of magnesium turnings and 23.3 g. of 3-dimethylaminopropyl chloride in 400 ml. of dry tetrahydrofuran) and the mixture was refluxed for 16 hours. Following conventional isolation and purification procedures, the N,N-dimethyl-p-[4-dimethylamino - 1 - hydroxy-1-(m-trifluoromethylphenyl) butyl]-benzenesulfonamide product was obtained in 91% yield. The base was converted to the hydrochloride salt by addition of one equivalent of hydrogen chloride in isopropanol, M.P. 230–231° C.

*Analysis.*—Calculated for $C_{21}H_{27}F_3N_2O_3S \cdot HCl$ is C, 52.44; H, 5.87; S, 6.67. Found: C, 52.63; H, 6.04; S, 6.60.

EXAMPLE 7

Preparation of N,N - dimethyl-p-[4-dimethylamino-1-hydroxy-1-(p-methoxyphenyl)butyl]benzenesulfonamide The procedure described in Example 6 was followed using N,N - dimethyl - p - (p-methoxybenzoyl)benzenesulfonamide, M.P. 166–167° C. N,N - dimethyl-p-[4-dimethylamino - 1 - hydroxy - 1 - (p-methoxyphenyl)butyl] benzenesulfonamide was obtained in 82% yield, M.P. 122–124° C. The compound analyzed correctly.

EXAMPLE 8

Preparation of N,N,N′,N′ - tetramethyl-4,4′-(4-dimethylamino - 1 - hydroxybutyl)bis(benzenesulfonamide) hydrochloride The procedure described in Example 6 was followed using 4,4′ - bis(dimethylsulfamoyl)benzophenone, M.P. 233–234° C. (obtained by oxidation of bis(p-dimethylsulfamoylphenyl)methane, M.P. 182–183° C.). The title compound was obtained in 35% yield, M.P. 250–251° C.

EXAMPLE 9

Preparation of N,N - dimethyl-p-(3-dimethylamino-1-hydroxy-1-phenylpropyl)benzenesulfonamide acid maleate A solution of 22.9 g. of p-acetyl-N,N-dimethylbenzenesulfonamide, 4.0 g. of paraformaldehyde and 10.5 g. of dimethylamine hydrochloride in 40 ml. of ethanol containing 0.5 ml. of concentrated hydrochloric acid was refluxed for 6 hours. The reaction was cooled to 0° C., the resulting precipitate was collected, dissolved in 500 ml. of water and filtered to remove unreacted starting material. The filtrate was made alkaline by addition of concentrated ammonia and the resulting precipitate was extracted into ether. N,N - dimethyl-p-(β-dimethylaminopropionyl)benzenesulfonamide separated, M.P. 90–91° C. and was converted to the hydrochloride salt, M.P. 183–184° C., obtained in 56% yield.

Analysis.—Calculated for $C_{13}H_{20}N_2O_3S \cdot HCl$ is C, 48.66; H, 6.60; Cl, 11.05. Found: C, 48.78; H, 6.69; Cl, 11.04.

The above salt (50.0 g.) was finely powdered and was added in portions to a cooled solution of phenyl-magnesium bromide (prepared from 18.5 g. of magnesium turnings and 119.0 g. of bromobenzene in one liter of anhydrous ethyl ether). The resulting suspension was stirred vigorously for 18 hours at room temperature. The resulting magnesium complex was decomposed by addition of 3 N ammonium chloride solution. Part of the product as the free base precipitated and was collected on a filter. Additional product was obtained from the ethereal solution on evaporation. The two portions were combined and an equivalent amount of maleic acid in isopropanol was added. After two recrystallizations from acetone-petroleum ether, the title compound was obtained in 80% yield, M.P. 155–158° C.

Analysis.—Calculated for $C_{19}H_{26}N_2O_3S \cdot C_4H_4O_4$ is C, 57.79; H, 6.32; S, 6.70. Found: C, 57.67; H, 6.18; S, 6.56.

EXAMPLE 10

Preparation of N,N - dimethyl-p-(1-hydroxy-1-phenyl-3-piperidinopropyl)benzenesulfonamide hydrochloride The procedure described in Example 9 was followed. N,N - dimethyl - p - (β - piperidinopropionyl)benzenesulfonamide hydrochloride was obtained in 45% yield, M.P. 217–218° C.

Analysis.—Calculated for $C_{16}H_{24}N_2O_3S \cdot HCl$ is C, 53.24; H, 6.98; N, 7.76. Found: C, 53.47; H, 6.85; N, 7.56.

The title compound was obtained in 59% yield, M.P. 246–247° C.

Analysis.—Calculated for $C_{22}H_{30}N_2O_3S \cdot HCl$ is C, 60.17; H, 7.12; Cl, 8.08. Found: C, 60.13; H, 6.92; Cl, 7.96.

What is claimed is:
1. A compound of the formula

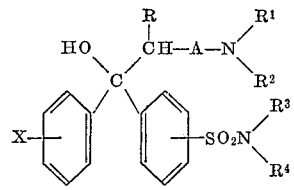

wherein:
(a) each of R, $R^1$, $R^2$, $R^3$, and $R^4$ is a member selected from the group consisting of hydrogen, (lower) alkyl, and $R^1$ and $R^2$ or $R^3$ and $R^4$, respectively, when taken together with the nitrogen to which they are joined are pyrrolidino, piperidino, piperazino or morpholino;
(b) A is saturated alkylene having 1 to 5 carbon atoms; and
(c) X is a member selected from the group consisting of hydrogen, (lower) alkyl, (lower) alkoxy, halogen, trifluoromethyl and the group

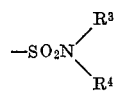

wherein $R^3$ and $R^4$ have the same meaning given hereinabove; and pharmaceutically acceptable acid addition salts thereof.

2. A compound of claim 1 wherein R is hydrogen; each of X and

is in the para- or meta-position of the phenyl ring; A is saturated alkylene having from 1 to 3 carbon atoms; and each of $R^1$, $R^2$, $R^3$ and $R^4$ is alkyl having 1 to 2 carbon atoms.

3. A compound of claim 2 wherein X is

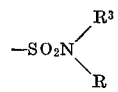

4. A compound of claim 2 wherein X is (lower) alkoxy.

5. A compound of claim 2 wherein X is trifluoromethyl.

6. A compound of claim 1 wherein each of R and X is hydrogen; each of $R^1$, $R^2$, $R^3$ and $R^4$ is methyl; A is 1,2-ethylene; and

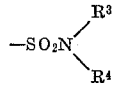

is N,N-dimethylsulfonamide on the para-position of the phenyl ring.

7. A compound of claim 1 wherein R is hydrogen; X is methoxy in the para-position of the phenyl ring; A is 1,2-ethylene; each of $R^1$ and $R^2$ is methyl; and

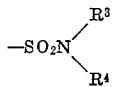

is N,N-dimethylsulfonamide in the para-position of the phenyl ring.

8. A compound of claim 1 wherein R is hydrogen; A is 1,2-ethylene; each of $R^1$ and $R^2$ is methyl; and each of X and

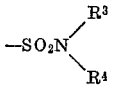

is N,N-dimethylsulfonamide in the para-position of each phenyl ring.

9. A compound of the formula

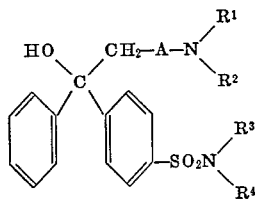

wherein A is saturated alkylene having from 1 to 3 carbon atoms and each of $R^1$, $R^2$, $R^3$ and $R^4$ is alkyl having 1 to 2 carbon atoms; and pharmacologically acceptable acid addition salts thereof.

10. A compound of claim 9 wherein each of $R^1$, $R^2$, $R^3$, and $R^4$ is methyl and A is 1,2-ethylene.

11. A compound of claim 9 wherein each of $R^1$, $R^2$, $R^3$ and $R^4$ is methyl and A is methylene.

References Cited

UNITED STATES PATENTS 3,157,656  11/1964  Krapcho _____ 260—268

OTHER REFERENCES

Burger, Medicinal Chemistry (Interscience, New York, 1960), p. 554.

HENRY R. JILES, *Primary Examiner.*

C. M. SHURKO, *Assistant Examiner.*

U.S. Cl. X.R.

260—326.5, 293.4, 268, 247.1, 240; 424—248, 250, 267, 274, 321